United States Patent [19]

Muenker et al.

[11] 4,268,319
[45] May 19, 1981

[54] HIGH TEMPERATURE SOLAR ABSORBER COATING AND METHOD OF APPLYING SAME

[75] Inventors: Adolf H. Muenker, Somerset; Archie R. Young, II, Montclair, both of N.J.

[73] Assignee: Exxon Research & Engineering Co., Florham Park, N.J.

[21] Appl. No.: 107,363

[22] Filed: Dec. 26, 1979

Related U.S. Application Data

[60] Division of Ser. No. 882,438, Mar. 1, 1978, Pat. No. 4,211,210, which is a continuation-in-part of Ser. No. 764,851, Feb. 2, 1977, abandoned.

[51] Int. Cl.³ .............................................. C09D 5/32
[52] U.S. Cl. .............................. 106/288 B; 106/287.1
[58] Field of Search ............ 106/287.1, 288 B, 308 Q, 106/311, 84, 287.35; 126/417, 438, 901

[56] References Cited

U.S. PATENT DOCUMENTS

| | | | |
|---|---|---|---|
| 3,356,515 | 12/1967 | McGlothlin | 106/304 |
| 3,392,036 | 7/1968 | McLeod | 106/287.1 |
| 4,011,190 | 3/1977 | Telkes | 106/290 |
| 4,071,380 | 1/1978 | Shutt | 106/287.1 |
| 4,097,311 | 6/1978 | Ishibashi et al. | 148/6.21 |

Primary Examiner—James Poer
Attorney, Agent, or Firm—Joseph J. Dvorak

[57] ABSTRACT

Improved coatings for high temperature solar collectors comprise thermally stable inorganic oxides selected from ferrites, metal oxides and mixtures thereof having solar absorptances greater than 0.9 at wavelengths ranging from about 0.35 to 3.0 microns. The coatings can be applied to a heat transfer surface by painting an organic silicate dispersion of the optically active material onto the substrate and thereafter curing the silicate binder.

7 Claims, 8 Drawing Figures

HIGH TEMPERATURE SOLAR ABSORBER COATING AND METHOD OF APPLYING SAME

CROSS-REFERENCE TO RELATED APPLICATIONS

This application is a division of application Ser. No. 882,438, filed Mar. 1, 1978, now U.S. Pat. No. 4,211,210, which in turn is a continuation-in-part of application Ser. No. 764,851, filed Feb. 2, 1977, now abandoned.

BACKGROUND OF THE INVENTION

1. Field of the Invention

This invention relates to coatings for high temperature solar thermal collectors. More particularly, this invention relates to coatings for high temperature, especially central receiver type, solar thermal collectors.

2. The Prior Art

Utilization of solar energy by heat absorption is well known. Typically, a tube or plate is used to absorb the solar radiation and to transfer the energy absorbed to a fluid with which it is in heat transfer relationship.

In low temperature solar systems (those reaching temperatures of approximately 220° F.), generally a flat plate, painted black, is used to directly collect the incident solar radiation. The black surface is an inexpensive technique for increasing the efficiency of such systems by increasing the relatively short wave radiation, i.e. below about 1.5 microns, which is absorbed by the tube or plate. An example of such a low temperature flat plate collector can be found in U.S. Pat. No. 3,952,725.

In intermediate temperature systms (those reaching temperature of generally up to about 550° F.), reflective surfaces or mirrors or Fresnel lenses and the like are employed to concentrate the incident solar radiation for absorption by the solar thermal collector. The solar radiation incident on the mirror, for example, is focused onto a tube or plate for absorption thereby and subsequent transfer of the energy absorbed to a fluid with which the tube or plate is in contact. Typically, in intermediate temperature systems the extent of solar concentration is in the range of about 10 to about 40 times the normal incident solar radiation.

In high temperature solar systems (those reaching temperatures in excess of about 550° F., and generally above 900° F.), heliotropic mechanisms are employed in conjunction with reflecting surfaces or mirrors so as to concentrate the normal solar radiation incident over a given area so that the radiation impinging on the tube or plate of the solar collector is from about 100 to about 1500 times greater than the normal incident solar radiation. In such a system, for example, a central receiver of concentrated solar radiation can be located in a tower centrally placed within a field of solar tracking reflectors.

For efficient operation of the intermediate and high temperature solar collectors, it has heretofore been considered most important that the coating on the collector have a solar absorptance, $\alpha$, as high as possible, the limit thereof being that of a theoretical black body or 100% with $\alpha=1.0$, and an emittance, $\epsilon$, in the infrared wavelength range (i.e., greater than 3 microns) as low as possible, preferably below 0.2.

Numerous attempts have been made in the past to develop "selective absorber coatings" for solar collectors. By "selective absorber coatings" is meant coatings which display a high absorptance, $\alpha$, over most of the solar spectrum and a high reflectance in the near infrared to minimize re-radiation losses. Selective absorbers are said to have high $\alpha/\epsilon$ ratios. One such coating is disclosed, for example, in U.S. Pat. No. 3,958,554.

There are numerous drawbacks associated with selective coatings. The primary deficiency of presently developed selective coatings is that although they are very effective absorbers through most of the solar spectrum, they effectively cut off the tail end of the higher wavelength region of the solar spectrum with the result that although re-radiation losses in the infrared are kept at a minimum due to the spectral selectivity of the coating, reflection losses at the tail end of the solar spectrum are greater than the energy gain realized from reduction in radiation losses. For example, a typical multilayer, state-of-the-art, selective collector coating will have a solar absorptance above 0.9 from 0.4 to 1.5 microns, but between 1.5 to 3.0 microns the solar absorptance typically decreases from 0.9 to 0.2 or below. Indeed, the cut-off point from high to low absorptance generally occurs at approximately 1.5 microns, which is far too early in the solar spectrum. Consequently, some of the incident solar radiation is reflected by the coating. The net result is that the overall solar absorptance is only about 0.85 to 0.90 (or 85 to 90%). Hence, while the selective coating effectively cuts down on re-radiation losses due to the low emissivity in the infrared ($\epsilon=0.1$), the selective coating lacks a high solar absorptance over the whole solar spectrum and about 10% to 15% of the solar radiation is lost dut to reflection.

Selective coatings have other major drawbacks. Notably, multilayer compositions require close control of layer thickness. Many selective coatings lack "in-place" reparability and many possess the potential for interdiffusion of the coating materials with concomitant loss of selectivity.

In high temperature solar collector systems, the attendant problems of selective coatings are even more severe. Many coatings remain selective only so long as the composition and/or film thickness have not changed. Many selective coatings, however, are not chemically stable at the temperatures prevailing in high temperature collectors. Thin films are permeable to oxygen at high temperature conditions also, and oxidation of the substrate results in both increased emittance and coating failure due to peeling of the film.

SUMMARY OF THE INVENTION

Generally speaking, the present invention contemplates an improved coating for a high temperature solar collector which has an absorptance greater than 0.9 at wavelengths ranging from about 0.35 to about 3.0 microns and preferably between 0.35 to about 2.5 microns. The solar absorbent coatings in accordance with the present invention are thermally stable inorganic oxides selected from the group consisting of ferrites, especially those ferrites containing up to four different metals in the crystal lattice, metal oxides, especially the metal oxides of nickel, cobalt, iron, molybdenum and strontium, and mixtures thereof.

In one embodiment of the present invention, there is provided a solar energy collector system including a heat transfer member having a surface coating thereon of an inorganic oxide having a solar absorptance greater than 0.9 at wavelengths ranging from about 0.35 to 3.0 microns.

In yet another embodiment of the present invention, there is provided a solar absorber coating composition having an absorptance in the cured state of greater than 0.9 at wavelengths between 0.35 to 3.0 microns, the composition comprising an optically active filler having an absorptance greater than 0.9 at wavelengths ranging between 0.35 to 3.0 microns, in an organic silicate, such as ethyl polysilicate, and an organic solvent such as ethylene glycol monoethyl ether or ethylene glycol monoethyl ether acetate, the ratio of inorganic filler to organic silicate binder generally between 1 to 3 and the ratio of organic silicate to solvent in the range of 0.5 to 2, both on a volume basis.

These and other embodiments of the present invention will become more apparent upon a reading of the detailed description of the invention which follows, particularly when read in light of the accompanying drawings.

DETAILED DESCRIPTION OF THE INVENTION

Figure 1:
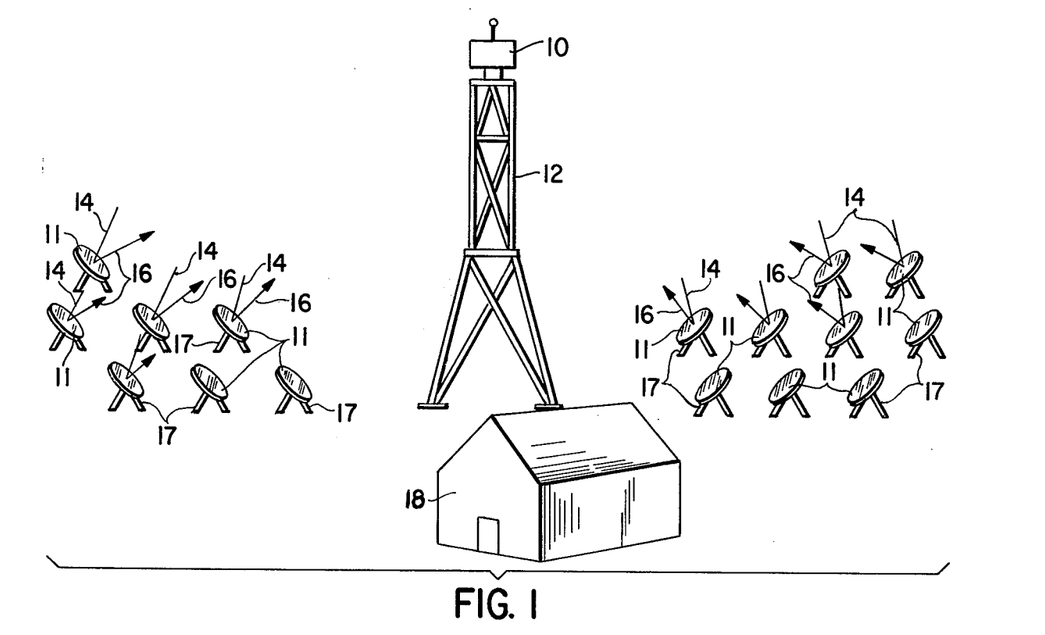
FIG. 1 diagrammatically shows a high temperature, central receiver type solar energy collector and system.

Referring first to the schematic drawing of FIG. 1, there is shown a central receiver high temperature solar collector 10 positioned on top of a tower 12 and with respect to a field of reflective surfaces 11 such that incident solar radiation is concentrated and directed to impinge on solar collector 10. The incident solar radiation is represented schematically by the line 14 and the reflected solar radiation is depicted by lines 16. The solar reflective surfaces 11 can be mounted on a base 17, for example, and have heliotropic mechanisms operatively associated therewith for tracking the incident solar radiation and reflecting it on the solar collector 10.

The solar collector may comprise a collector plate or tube having a coating on the surface thereof. The surface coating, which is the subject of the invention, will be described in greater detail hereinafter.

The fluid to be heated by the solar radiation is pumped from the collector 10 to a power station 18 where it is used, for example, to drive a steam turbine and an electric generator. After being cooled, the fluid is returned via the tower to collector 10 to again be heated.

Since the system described in FIG. 1 is a concentrating high temperature solar collector system, the temperature of the fluid leaving collector 10 will be in excess generally of 440° F. Indeed, in the practice of the present invention, the system will have sufficient reflecting surfaces to concentrate incident solar radiation and provide a collector temperature generally in excess of about 550° F. and preferably between 1000° F. to 1600° F.

Figure 2:
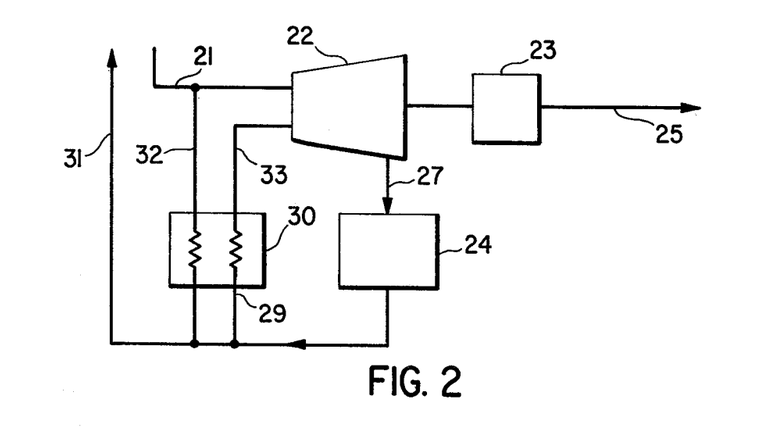
FIG. 2 is a schematic diagram illustrating the use of the solar thermal energy collected in the collector of FIG. 1.
Figure 3:
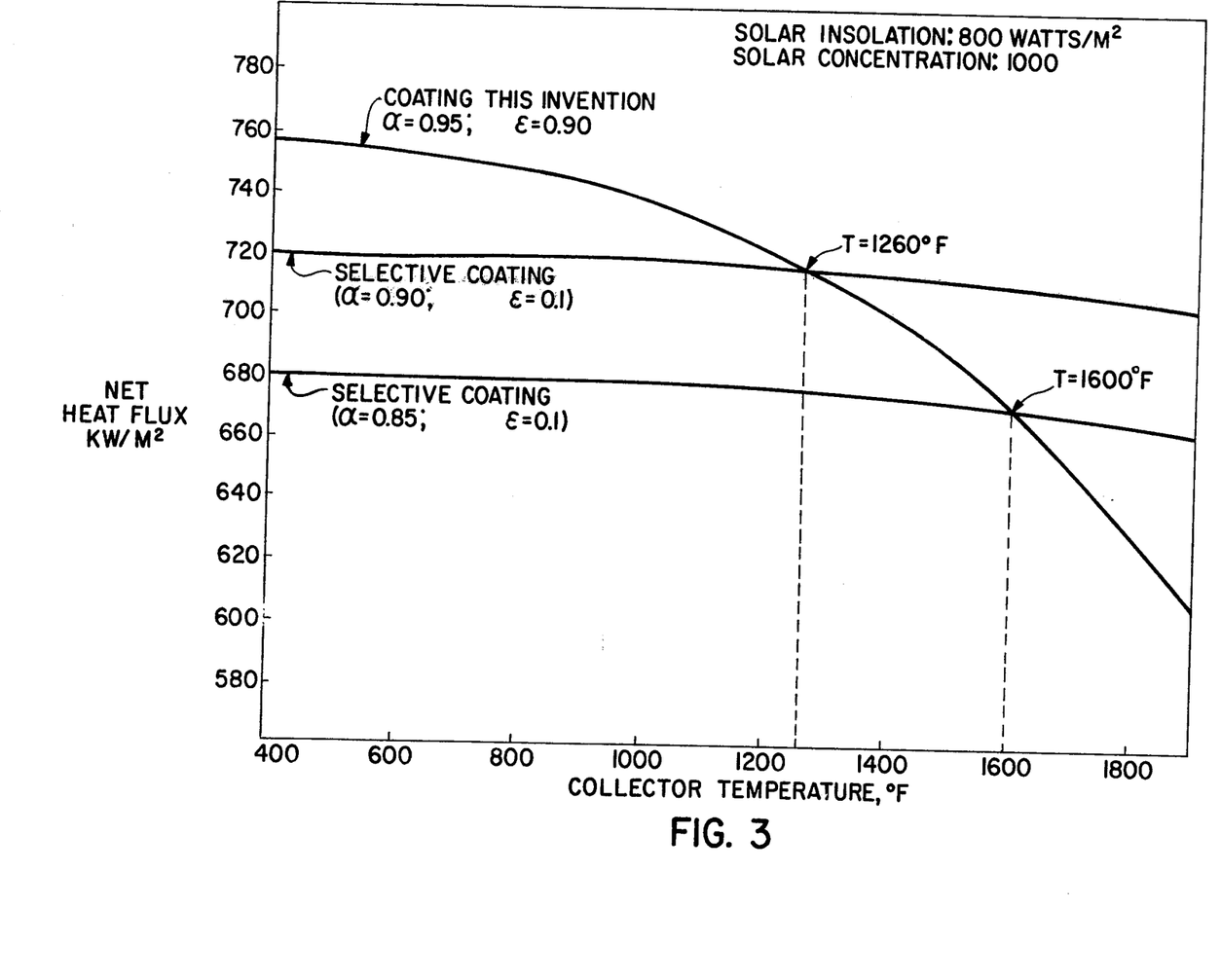
FIGS. 3 through 6 graphically depict heat flux calculations of the collector coatings exhibiting different absorptances and emittances at solar concentrations of 1000, 100 and 40, and solar insolations of 800 and 700 watts/m$^2$, respectively.
Figure 4:
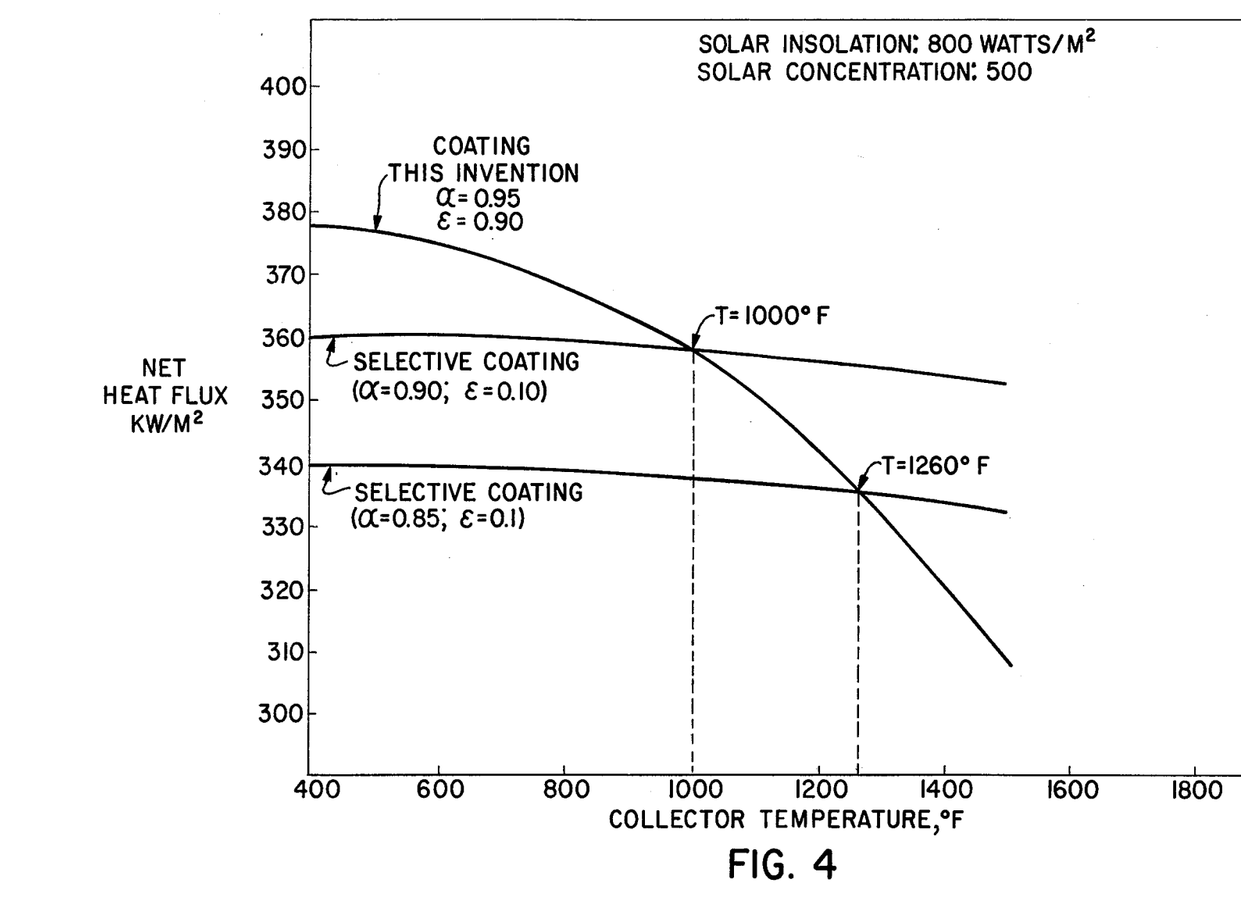
Figure 5:
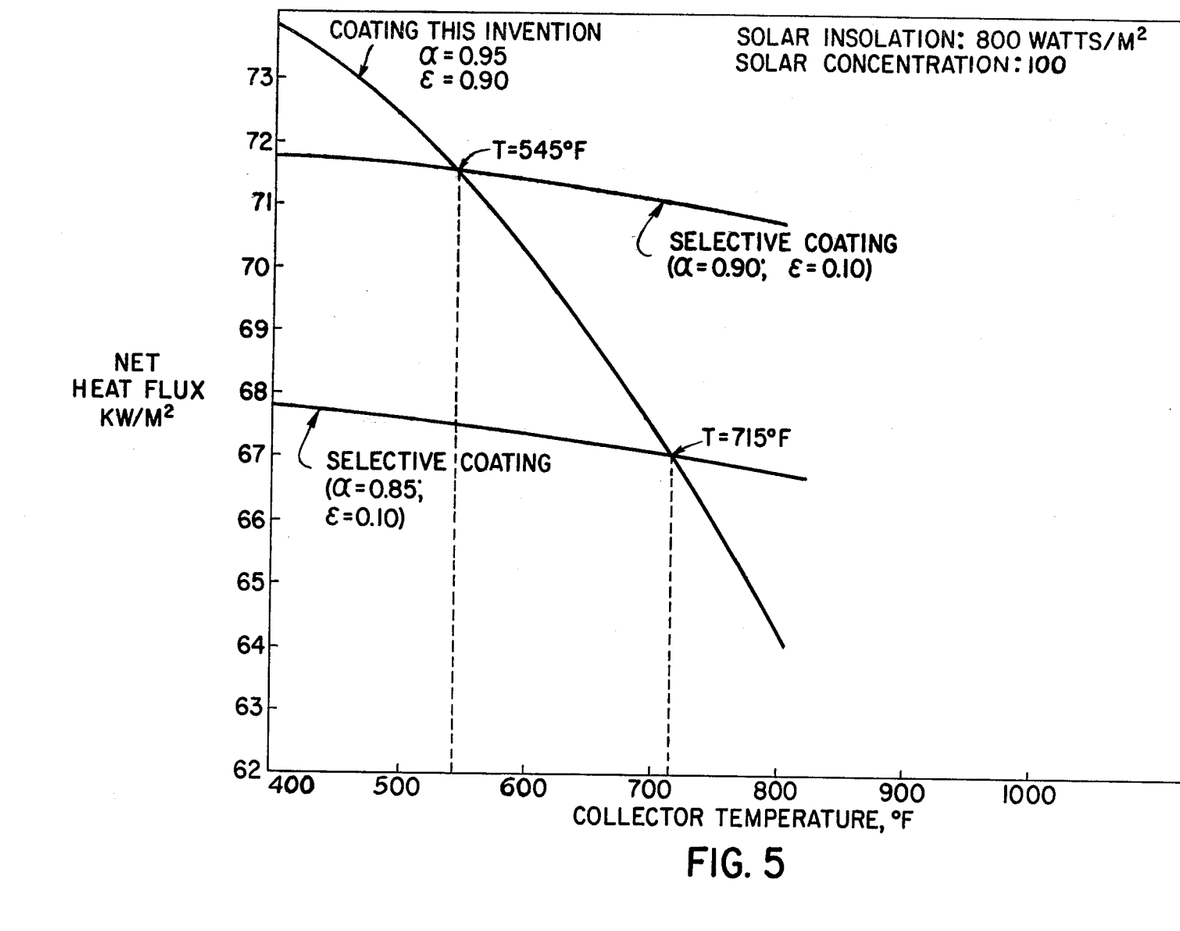
Figure 6:
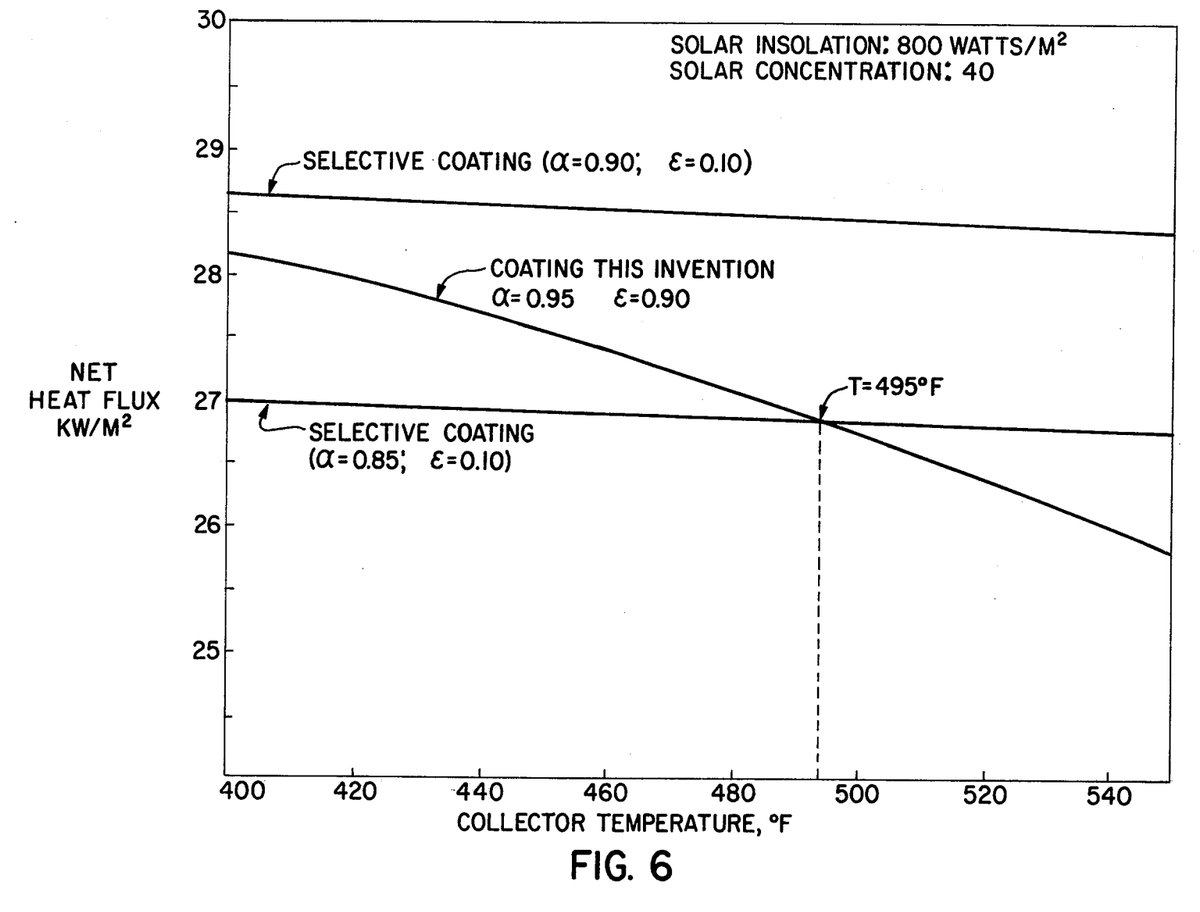

As can be seen in FIG. 2, the high temperature fluid is pumped by line 21 to drive a steam turbine 22, for example, located in the power station 18 of FIG. 1. The turbine 22 is operatively connected to an electric generator 23, the electric output of which is fed to a point of use via line 25. Fluid exhausting from turbine 22 is fed by line 27 to a cooling station 24. The cooled fluid is then returned by line 31 to collector 10 to be reheated. As can be seen in FIG. 2, a heat storage zone 30 is also provided. Depending upon electrical demand, hot fluid from collector 10 can optionally be pumped via line 32 to heat storage zone 30 where the heat of the fluid is exchanged and stored. The thus-cooled fluid is returned to collector 10 from zone 30 by line 31. Similarly, a bipass is provided so that cool fluid from station 24 can be routed by line 29 through heat storage zone 30 where the fluid is heated and sent by line 33 to drive turbine 22.

Although the high temperature solar collector system just described is of the central receiver type of system, it should be readily appreciated that other variations in effecting the concentration and collection of solar radiation and use of thermal energy derived therefrom can be provided without departing from the spirit and scope of the invention set forth hereinafter in the appended claims. Most significantly, the improved coatings of the present invention are suitable for high temperature collectors, i.e. collectors operable at temperatures of about 550° F. and higher and where the incident solar radiation impinging on the collector has been concentrated from at least 40 up to about 2000 times the normal radiation incident in the given area.

In any event, the heat transfer members of the high temperature collectors employed in the system of the above-described figure have a coating on the surface thereof, which coating has a high solar absorptance, $\alpha$, at wavelengths between 0.35 microns to about 3.0 microns. Indeed, it is permissible for such coating to have emittances greater than 0.45 in the infrared wavelength range (i.e. greater than 3 microns). This coating stands in marked contrast to prior art "selective coatings" which are characterized by absorptances of up to 0.9 at wavelengths ranging between 0.35 microns to about 1.9 microns and emittances well below 0.4 and generally as low as 0.1.

Analysis of the energy balance (absorbed solar energy vs. re-radiation losses) of high temperature solar collectors shows that for applications where high solar concentrations are required, an increase in solar absorptance over the entire solar spectrum to 0.95, for example, is more important than a reduction in the near-infrared emittance from 0.90 to 0.10. Thus, although a selective coating effectively cuts down on re-radiation losses due to the low emittance in the infrared, e.g., where $\epsilon=0.1$, the selective coating lacks a high solar absorptance over the total solar spectrum, and about 10% to about 15% of the incident solar radiation is lost due to reflection. Typically, if solar radiation at wavelengths greater than 1.50 microns, for example, is reflected rather than being absorbed, the net result is that the overall solar absorptance is only about 0.85 to 0.90. As a consequence thereof, an absorbent coating which has an absorptance greater than 0.90 and preferably as high as 0.95 even with an emittance, $\epsilon$, of about 0.90 is a far more efficient absorber than a selective coating having an absorptance of 0.85 and an emittance, $\epsilon$, of 0.1 at high solar concentrations.

As a further illustration of the foregoing conclusions, the net thermal energy gain has been compared for three specific cases of solar collector coatings: (a) a selective coating having $\alpha=0.85$ and $\epsilon=0.1$; (b) a selective coating having $\alpha=0.90$ and $\epsilon=0.1$; and (c) a coating of this invention having an absorptance $\alpha=0.95$ and an emissivity $\epsilon=0.90$. The net energy gain for these three solar absorber coatings was calculated for collector temperatures of 400° F. to 2000° F. Radiation losses were calculated from the Stefan-Boltzmann equation. Convection losses were not considered since they would be identical for both selective absorption coatings and the absorbent coating of this invention and, therefore, would not affect the comparison. The calculations were made for two average solar insolations and for four solar concentration levels. The net heat flux calculations for the three collector coatings exhibiting different absorptances and emittances are given in Tables 1 and 2. The net heat flux referred to is the absorbed solar energy less re-radiated energy. The absorbed energy is equal to the product of solar insolation, the absorptance and solar concentration. As indicated before, the re-radiated energy is defined by the Stefen-Boltzmann equation. It should be noted that the nonselective coating 3 shown in the Tables is a coating of this invention.

TABLE 1

COMPARISON OF NET HEAT FLUX FOR NONSELECTIVE COATINGS OF THIS INVENTION WITH TWO SELECTIVE COATINGS
Average Solar Insolation: 800 watts/m²

| | Net Heat Flux (KW/M²) | | |
|---|---|---|---|
| Collector Temp. °F. | Selective Coating 1 ($\alpha_1 = 0.85$) ($\epsilon_1 = 0.10$) | Selective Coating 2 ($\alpha_2 = 0.90$) ($\epsilon_2 = 0.10$) | Nonselective Coating 3 ($\alpha_3 = 0.95$) ($\epsilon_3 = 0.90$) |
| Solar Concentration: 1000 | | | |
| 400 | 679.8 | 719.8 | 757.8 |
| 600 | 679.4 | 719.4 | 754.3 |
| 800 | 678.7 | 718.7 | 748.2 |
| 1000 | 677.6 | 717.6 | 738.3 |
| 1340 | 674.4 | 714.4 | 709.3 |
| 1500 | 672.1 | 712.1 | 688.6 |
| 2000 | 660.3 | 700.3 | 582.6 |
| Solar Concentration: 500 | | | |
| 400 | 339.8 | 359.8 | 377.8 |
| 600 | 339.4 | 359.4 | 374.3 |
| 800 | 338.7 | 358.7 | 368.2 |
| 1000 | 337.6 | 357.6 | 358.3 |
| 1340 | 334.4 | 354.4 | 329.3 |
| 1500 | 332.1 | 352.1 | 308.6 |
| 2000 | 320.3 | 340.3 | 202.6 |
| Solar Concentration: 100 | | | |
| 400 | 67.8 | 71.8 | 73.8 |
| 500 | 67.6 | 71.6 | 72.3 |
| 600 | 67.4 | 71.4 | 70.3 |
| 700 | 67.1 | 71.1 | 67.6 |
| 800 | 66.7 | 70.7 | 64.2 |
| 1000 | 65.6 | 69.6 | 54.3 |
| Solar Concentration: 40 | | | |
| 400 | 27.0 | 28.6 | 28.2 |
| 450 | 26.9 | 28.5 | 27.5 |
| 500 | 26.8 | 28.4 | 26.7 |
| 550 | 26.7 | 28.3 | 25.8 |
| 600 | 26.6 | 28.2 | 24.7 |
| 800 | 25.9 | 27.5 | 18.6 |
| 1000 | 24.8 | 26.4 | 8.7 |

TABLE 2

COMPARISON OF NET HEAT FLUX FOR NONSELECTIVE COATING OF THIS INVENTION WITH TWO SELECTIVE COATINGS
Average Solar Insolation: 700 watts/m²

| | Net Heat Flux (KW/M²) | | |
|---|---|---|---|
| Collector Temp. °F. | Selective Coating 1 ($\alpha_1 = 0.85$) ($E_1 = 0.10$) | Selective Coating 2 ($\alpha_2 = 0.90$) ($E_2 = 0.10$) | Nonselective Coating 3 ($\alpha_3 = 0.95$) ($E_3 = 0.90$) |
| Solar Concentration: 1000 | | | |
| 400 | 594.7 | 629.8 | 662.8 |
| 600 | 594.4 | 629.4 | 659.3 |
| 800 | 593.7 | 628.7 | 653.2 |
| 1000 | 592.6 | 627.6 | 643.3 |
| 1340 | 589.4 | 624.4 | 614.3 |
| 1500 | 587.1 | 622.1 | 593.6 |
| 2000 | 575.3 | 610.3 | 487.6 |
| Solar Concentration: 500 | | | |
| 400 | 297.3 | 314.8 | 330.3 |
| 600 | 296.9 | 314.4 | 326.8 |
| 800 | 296.2 | 313.7 | 320.7 |
| 1000 | 295.1 | 312.6 | 310.8 |
| 1340 | 291.9 | 309.4 | 281.8 |
| 1500 | 289.6 | 307.1 | 261.1 |
| 2000 | 277.8 | 295.3 | 155.1 |
| Solar Concentration: 100 | | | |
| 400 | 59.3 | 62.8 | 64.3 |
| 500 | 59.1 | 62.6 | 62.8 |
| 600 | 58.9 | 62.4 | 60.8 |
| 700 | 58.6 | 62.1 | 58.1 |
| 800 | 58.2 | 61.7 | 54.7 |
| 1000 | 57.1 | 60.6 | 44.8 |
| Solar Concentration: 40 | | | |
| 400 | 23.6 | 25.0 | 24.4 |
| 450 | 23.5 | 24.9 | 23.7 |
| 500 | 23.4 | 24.8 | 22.9 |
| 600 | 23.2 | 24.6 | 20.9 |
| 800 | 22.5 | 23.9 | 14.8 |
| 1000 | 21.4 | 22.8 | 4.9 |

The results are graphically represented in FIGS. 3 to 6.

Indeed, FIGS. 3 to 6 clearly depict the temperature regimens at which the absorber coating of the present invention is more efficient than either of the two selective coatings at an average solar insolation of 800 watts/m². Thus, at a solar concentration of 1000, the coating of this invention is more efficient than the selective coating with an absorptance of 0.85 and an emissivity of 0.1 at collector temperatures as high as 1600° F. The same comparison with the selective coating having an absorptance of 0.90 and emissivity of 0.1 shows that the temperature at which a solar absorbent coating of this invention and the selective coating have equivalent net energy gains at 1260° F., a temperature that is well within the projected collector temperature range for high tower receiver concepts. Even at solar concentrations of 40, a coating of the present invention ($\alpha=0.95$, $\epsilon=0.9$) is still more efficient than a selective coating of ($\alpha=0.85$, $\epsilon=0.1$) at collector temperatures of 495° F.; however, an increase in the absorptance of the selective coating to 0.9, with $\epsilon=0.1$, makes the selective coating approximately 6% more efficient than the coating of the present invention at a collector temperature of 500° F.

In any event, it is clear from the data that at the high solar concentrations, for example concentrations greater than 100, a fractional gain in absorptance is more important than a reduction in emittance from 0.9 to 0.1. Selectivity, i.e. reduction in emittance, is significant only at low solar concentration, i.e. below about 40.

In accordance with the present invention, a solar absorber coating is provided having an absorptance, α, greater than about 0.90 and preferably about 0.95 and greater (the limit thereof being that of a theoretical black body or α=1.00) over the solar spectrum ranging in wavelength from 0.35 microns to about 3.0 microns. The absorber coating comprises thermally stable metal oxides, ferrites and mixtures thereof. The metal oxides are represented by the general formula $M_bO_c$ wherein M is selected from nickel, cobalt, strontium and molybdenum; b is a number ranging from 1 to 3 and c is a number ranging from 1 to 4. Such metal oxides are well known compounds. The preferred metal oxide solar absorbing material is $Co_3O_4$.

By the term "ferrite" is meant a multiple oxide of ferric oxide represented generally by the formula $M'Fe_2O_4$ wherein M' is at least one and as many as four different mono- or di-valent metals selected from nickel, zinc, lithium, molybdenum, manganese, magnesium, cobalt, copper, strontium, barium, aluminum, gadolinium and yttrium and in which iron (Fe) is in the +3 oxidation state. Many ferrites are naturally occurring materials such as magnetite, $Fe_3O_4$, hematite, $Fe_2O_3$, jacobtite, $(Fe,Mn)_3O_4$, and the like. Ferrites are also readily prepared from metal oxides and iron oxide in accordance with the equation below:

$$MO + Fe_2O_3 \rightarrow MFe_2O_4$$

Among the preferred ferrite solar absorbing materials in accordance with the present invention are the following:

$Ni_{.35}Zn_{.65}Fe_2O_4$, $2CoO.BaO.8Fe_2O_3$, $CoFe_2O_4$,
$(Li_{.5}Fe_{.5})_{.9}Zn_{.1}Fe_2O_4$,
$(Li_{.5}Fe_{.5})_{.45}Ni_{.175}Zn_{.375}Fe_2O_4$.

In accordance with the present invention, the heat transfer member of the solar collector is coated with the solar absorber coatings. Coating can be achieved by arc plasma or flame spraying the absorber coating material on a suitable high temperature metal alloy material such as nickel alloys sold under the trademark Hastelloy by Union Carbide, N.Y.; nickel-chromium alloys sold by the Internal Nickel Company, Huntington, W.V., under the trademark Inconel; or a cobalt-molybdenum alloy substrate used in the construction of, for example, high temperature furnace tubes. When using the arc plasma or flame spraying technique, an inorganic binder need not be used since the particles of the absorber material (generally less than 60 mesh in size and preferably below 60 mesh in size) are heated sufficiently high so as to liquify the particles on the surface of the heat transfer member, thus forming an adequate bond with the heat transfer member. However, a glassy binder matrix material of similar particle size, such as silica, may be premixed with the absorber coating material and codeposited on the substrate and the ratio of glassy binder material to optically active absorber material will range from about 10 to 50 volume % and preferably in the range of 10 to 30 volume %.

The solar absorber coating of the present invention may be applied most conveniently to the heat transfer member and bonded to the surface thereof by mixing the optically active absorbing material with organic polysilicate in an appropriate solvent and applying the paint suspension by conventional paint spraying techniques. Thus, a solar absorbing composition is first prepared from the optically active solar absorber material and a suitable binder such as the aforementioned organic silicate. Typically, the filler material will have a particle size below about −100 mesh U.S. Standard Sieve Size and preferably about −325 mesh size U.S. Standard Sieve Size. The binder material selected will be an organic silicate such as alkyl polysilicates and especially ethyl polysilicate in an organic solvent such as ethylene glycol monoethyl ether and ethylene glycol monoethyl ether acetate. The ratio of solvent to organic silicate will be in the range of about 20 to 80 volume % and preferably in the range of about 40 to 60 volume %. The ratio of optically active material to binder (including the organic solvent) will be in the range of 1 to 3, and preferably in the range of 1.5 to 2.

As indicated hereinabove, the suspension of the optically active absorber material and paint vehicle is applied by conventional paint spraying techniques to the heat transfer member of the solar collector. The paint vehicle typically cures at room temperature. Thus, after applying the optical filler and binder to the substrate, the substrate is allowed to stand at ambient conditions for a time sufficient for the paint vehicle to cure. Optionally, and preferably, after applying the optical filler and binder to the surface of the substrate, the so-coated substrate is heated to temperatures in the range of about 300° F. to 400° F. in the air so as to completely cure the coating.

The following examples will serve to further illustrate the invention:

EXAMPLE 1

A series of solar absorber coatings illustrative of the type described hereinabove were prepared using commercially available alkyl silicate binders. The optically active filler material or solar absorbing material was dispersed in the binder and thereafter applied by paint spraying the suspension onto a blank metal substrate. After curing at room temperature for about 24 hours, the solar absorptance of the coating was measured at wavelengths of from 0.4 microns to 3.0 microns and integrated over the solar spectrum. Thereafter, the solar absorptances were again measured after 24 hours exposure of the coated substrate to air at 1300° F. The composition of the filler and the filler/binder ratios as well as the results are given in the table below:

| Run No. | Composition of Optical Filler | Binder | Filler/ Binder Ratio | Integrated Solar Absorptance | |
|---|---|---|---|---|---|
| | | | | As Prepared | After 24 hours at 1300° F. |
| 1 | $Ni_{.35}Zn_{.65}Fe_2O_4$ | Silbond H5* | 2/1 | 0.918 | 0.939 |
| 2 | $2CoO . BaO . 8Fe_2O_3$ | Silbond H5* | 1.63/1 | 0.941 | 0.921 |
| 3 | $CoFe_2O_4$ | Silbond H5* | 1/1 | 0.946 | 0.933 |
| 4 | $Ni_{.35}Zn_{.65}Fe_2O_4$ | Silbond H6* | 2/1 | 0.929 | 0.904 |
| 5 | $(Li_{.5}Fe_{.5})_{.9}Zn_{.1}Fe_2O_4$ | Silbond H6* | 2/1 | 0.952 | ND |
| 6 | $(Li_{.5}Fe_{.5})_{.45}Ni_{.175}Zn_{.375} . Fe_2O_4$ | Silbond H6* | 2/1 | 0.913 | 0.887 |
| 7 | $Co_3O_4$ | Silbond H6* | 2/1 | 0.924 | 0.930 |
| 8 | $2CoO . BaO . 8Fe_2O_3$ | Silbond H6* | 1.5/1 | 0.908 | 0.901 |

-continued

| Run No. | Composition of Optical Filler | Binder | Filler/ Binder Ratio | Integrated Solar Absorptance | |
|---|---|---|---|---|---|
| | | | | As Prepared | After 24 hours at 1300° F. |
| 9 | $Fe_3O_4$ | Silbond H5* | 2/1 | 0.968 | ND |

*Silbond H5 and H6 are the tradenames of the Stauffer Chemical Company, Westport, CT, for an ethyl polysilicate having the general formula $(C_2H_5O)_3SiO[(C_2H_5O)_2SiO]_xSi(OC_2H_5)_3$, the former being a blue liquid having a vapor pressure at 68° F. of 36 mm Hg, and the latter being a white to pale yellow liquid with a vapor pressure at 68° F. of 24 mm Hg.
ND - Not determined.

Figure 7:
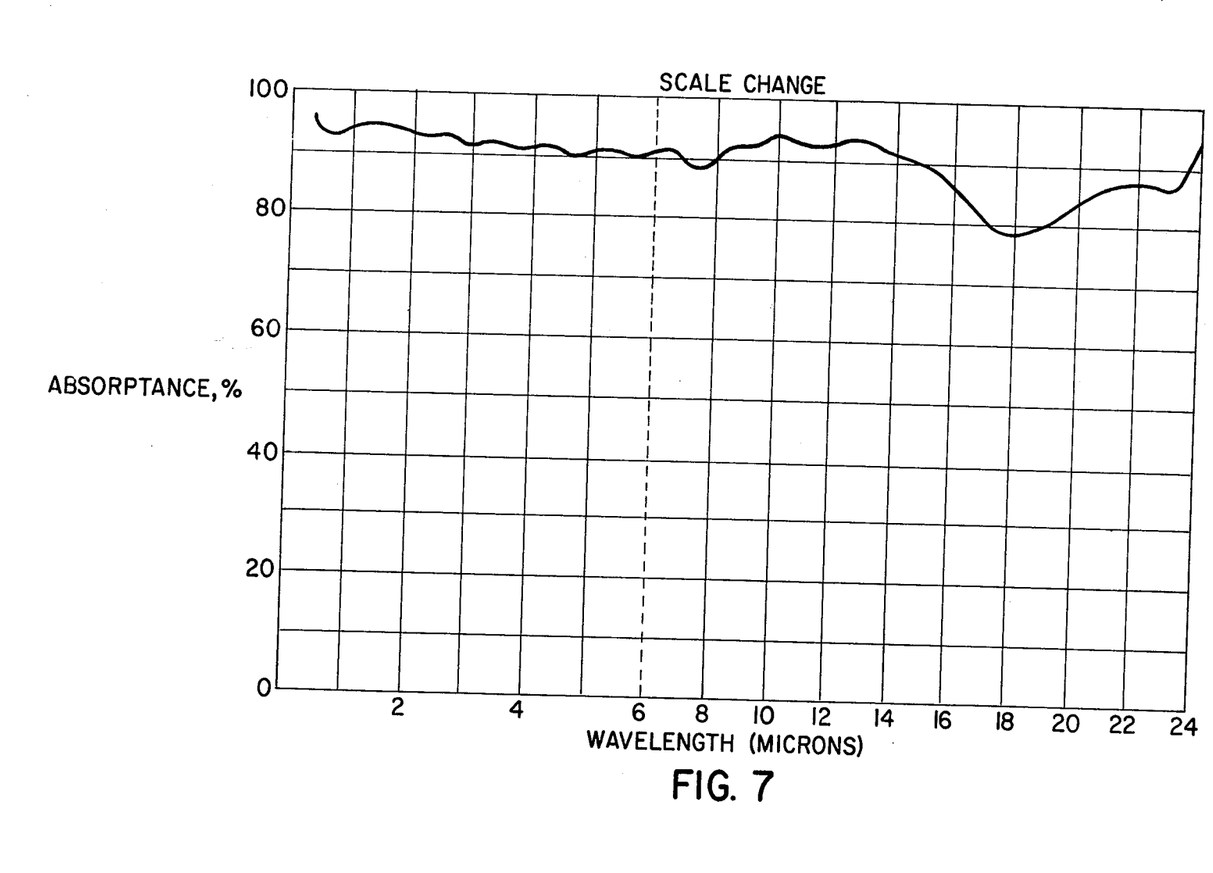
FIG. 7 shows the absorptance measurement of one high temperature absorber coating of the present invention.

FIG. 7 shows the solar absorptance of the asprepared coating of Run 1 at wavelengths from 0.24 to 24 microns.

As can be seen from the above data, the coatings prepared displayed absorptances greater than 0.90 and with the exception of composition #6, even after exposure for 24 hours to air at 1300° F., the absorptance remained above 0.90.

EXAMPLE 2

Figure 8:
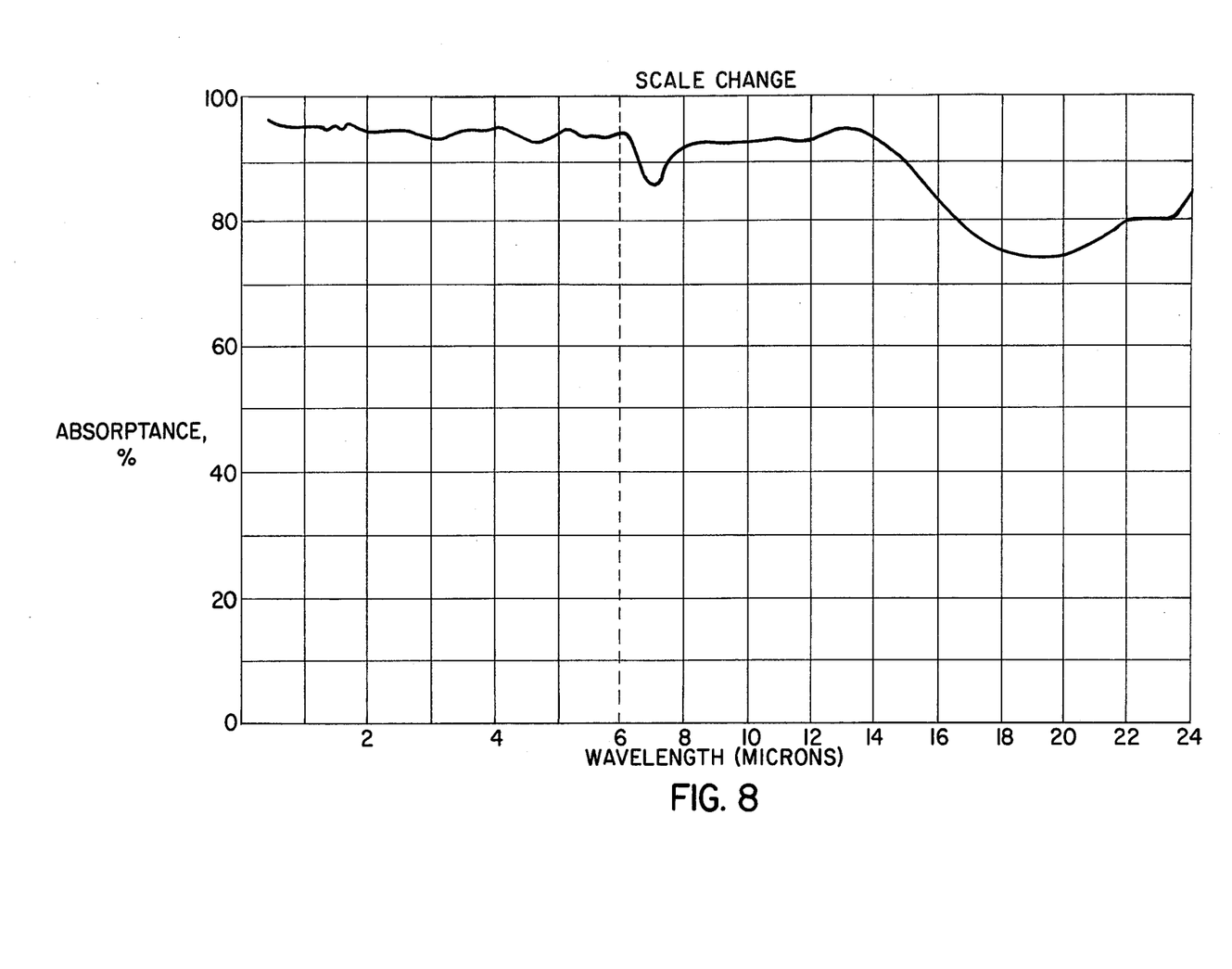
FIG. 8 shows the absorptance measurement of yet another high temperature absorber coating prepared via arc plasma spraying.

In this particular example, a high nickel-molybdenum alloy was coated with a lithium-zinc ferrite having the composition $(Li_{.5}Fe_{.5})_{.9}Zn_{.1}Fe_2O_4$ by depositing −325 mesh (U.S. Standard Sieve Size) ferrite powder of the aforementioned composition using an arc plasma spray system with argon as the plasma and carrier gas at a power input of 20 kilowatts and a plasma gas flow rate of 85 ft$^3$/hr. After coating the metal substrate with the lithium-zinc ferrite, the coated substrate was repeatedly exposed to the temperature of a jet afterburner combustor at a temperature in the range of 1800° F. to 1900° F. and subsequently cooled to near ambient temperature. The operation was repeated for a total of 50 times. The coating withstood the high temperature cycling without any ill effects. The absorptance characteristics of the coating from 1 to 24 microns after high temperature cycling exposure is given in FIG. 8. It is noted that below 4 microns, the absorptance is 0.95.

What is claimed is:

1. A composition capable of forming solar absorbing coating having a solar absorptance greater than 0.90 on solar absorbers for solar collectors of the type operable at temperatures above 550° F. comprising: an optical filler and a binder in the weight ratio ranging from about 1 to 1 to about 3 to 1, said optical filler having a particle size in the range of from about −100 mesh to about −325 mesh, said optical filler being an inorganic oxide which is thermally stable at operating temperatures above 550° F. and which has a solar absorptance greater than about 0.90 at wavelengths of from about 0.35 microns to about 3.0 microns, said inorganic oxide being selected from the group consisting of ferrites, oxides of nickel, cobalt, iron, molybdenum and strontium and mixtures thereof, said binder being an alkyl polysilicate.

2. The composition of claim 1 wherein the binder is ethyl polysilicate dissolved in about 20 volume % to about 80 volume % organic solvent.

3. The composition of claim 2 wherein the inorganic oxide is a ferrite having from 1 to 4 different metals in the crystal lattice, said metals being selected from nickel, zinc, lithium, molybdenum, manganese, magnesium, cobalt, copper, strontium, barium, aluminum, gadolinium and yttrium.

4. The composition of claim 3 wherein the ferrite is a lithium-zinc ferrite.

5. The composition of claim 3 wherein the ferrite is a nickel-zinc ferrite.

6. The composition of claim 3 wherein the ferrite is a lithium-nickel-zinc ferrite.

7. The composition of claim 3 wherein the ferrite is a barium-cobalt ferrite.

* * * * *